F. HARDINGE.
SEAL FOR FASTENING DEVICES.
APPLICATION FILED MAY 19, 1915.

1,315,832.

Patented Sept. 9, 1919.

Witnesses:
Albin C. Ahlberg
H. A. Neiburger

Inventor
Franklin Hardinge
By William P. Bradbury
Attorneys.

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

SEAL FOR FASTENING DEVICES.

1,315,832.   Specification of Letters Patent.   Patented Sept. 9, 1919.

Application filed May 19, 1915. Serial No. 29,046.

*To all whom it may concern:*

Be it known that I, FRANKLIN HARDINGE, a citizen of the United States, residing at Chicago, in the county of Cook and State of Illinois, have invented a certain new and useful Improvement in Seals for Fastening Devices, of which the following is a full, clear, concise, and exact description, reference being had to the accompanying drawings, forming a part of this specification.

My invention relates to seals for fastening devices and has for its object the provision of a seal adapted to be used in connection with fastening devices, such as screws, etc., whereby removal of the devices—without detection—is prevented.

Generally the device of my invention consists of a cup shaped member arranged to be securely held by the screw or fastening device. Adapted to be inserted into this cup shaped member is a dish-shaped seal, which after being inserted into the cup is flattened to cover the head of the screw. Access to the screw is therefore prevented unless the seal is removed. To hold the seal in position over the head of the screw, I provide a flange on the cup member which extends outwardly over the seal, after it has been flattened by means of a suitable tool, as will be subsequently explained.

My invention will be more clearly understood by referring to the accompanying drawings, in which.

Similar characters of reference refer to similar parts throughout the several views.

Figure 1:
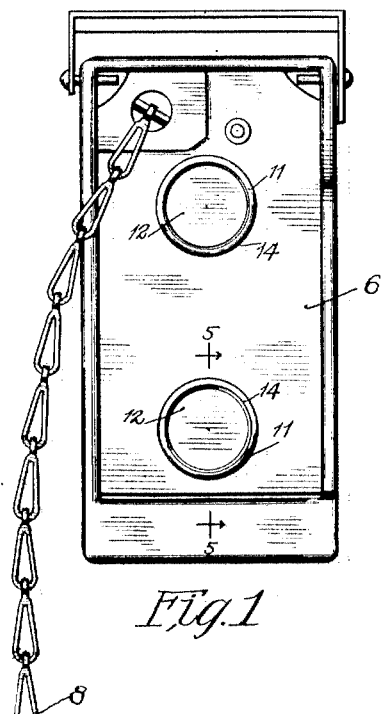
Figure 1 is a front elevational view of a watchman's clock key box, provided with the device of my invention.
Figure 2:
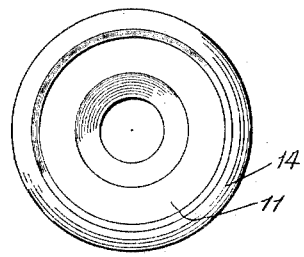
Fig. 2 is a detail view of the cup member, forming a part of the seal.
Figure 3:
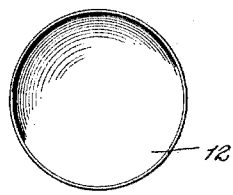
Fig. 3 is a detail view of the dish-shaped seal, *per se.*

Referring first to Fig. 1, I have illustrated at 6 a watchman's clock key box—which carries a key 7 attached to the end of a suitable chain 8. This chain 8 is connected in any suitable way to the box 6. I have shown this box in connection with the seal device of my invention but it will readily be understood that the seal may be used in connection with any article to be held by fastening devices.

Figure 4:
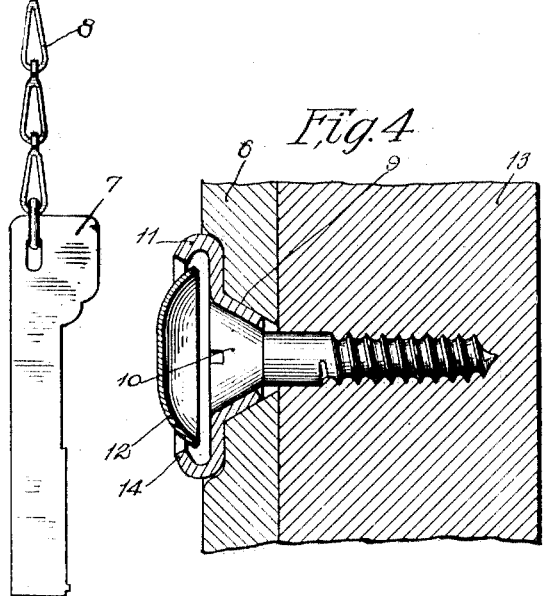
Fig. 4 is a cross-sectional view of the seal of my invention, shown in connection with a screw. The seal *per se* in this figure is shown in position before it is flattened to cover the head of the screw.
Figure 5:
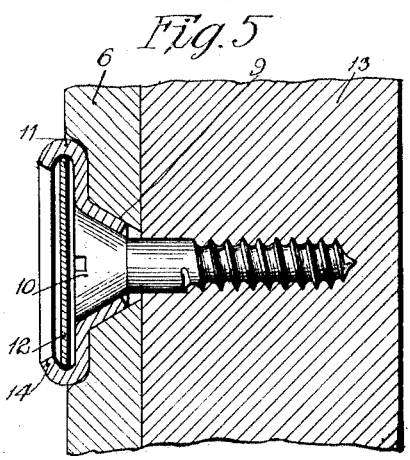
Fig. 5 is a view similar to Fig. 4, with the seal member flattened. This figure is taken along the line 5—5 of Fig. 1, looking in the direction indicated by the arrows.

The box 6, or article to be secured, is provided with an aperture at 9, between the wall of which and screw 10 is arranged to be clamped the cup 11 of the seal. This cup 11 carries a flange 14 which extends inwardly, as illustrated in Figs. 4 and 5. Arranged to extend into the cup 11 is a dish-shaped seal 12, preferably made of light material such as aluminum. The diameter of this dish-shaped seal is slightly less than the diameter of the opening, leading into cup 11. This difference in diameter permits the seal 12 to be inserted into the cap, as most clearly shown in Fig. 4.

After the seal has thus been inserted, the seal is flattened by means of a suitable tool, to the position illustrated in Fig. 5. The flattening of the seal member 12 causes the same to spread outwardly, so as to engage the inner wall of the cup member 11. Removal of the seal is then prevented due to the flange 11, extending over the same.

In Figs. 4 and 5, 6 illustrates the article to be held and 13 illustrates a wall or support to which the article is to be secured. In removing the screw 10 from the wall 13, after the seal has been attached thereto, the disk 12 must be removed, the removal of which necessarily causes mutilation of the same.

Having thus described my invention, what I claim as new and desire to secure by United States Letters Patent is—

1. The combination with a screw, of a sheet metal cup having a centrally located aperture through which the screw extends, the aperture being smaller than the head of the screw so as to prevent removal of the cup over the screw head, a dished metal seal adapted to be inserted into the container over the head of the screw and flattened to cover a larger area, and a flange carried by the cup for holding the seal when flattened.

2. The combination with a screw, of a sheet metal cup having an internal groove and a centrally located aperture through which the screw extends, the aperture being smaller than the head of the screw so as to prevent removal of the cup over the screw head, and a dished metal seal adapted to be inserted into the container over the head of the screw and flattened to cover a larger area, the seal when flattened projecting into said internal groove whereby removal of the seal is prevented unless it is mutilated.

In witness whereof, I have hereunto subscribed my name this 17th day of May A. D. 1915.

FRANKLIN HARDINGE.

Witnesses:
 MARY A. COOK,
 A. C. AHLBERG.